Patented Aug. 9, 1949

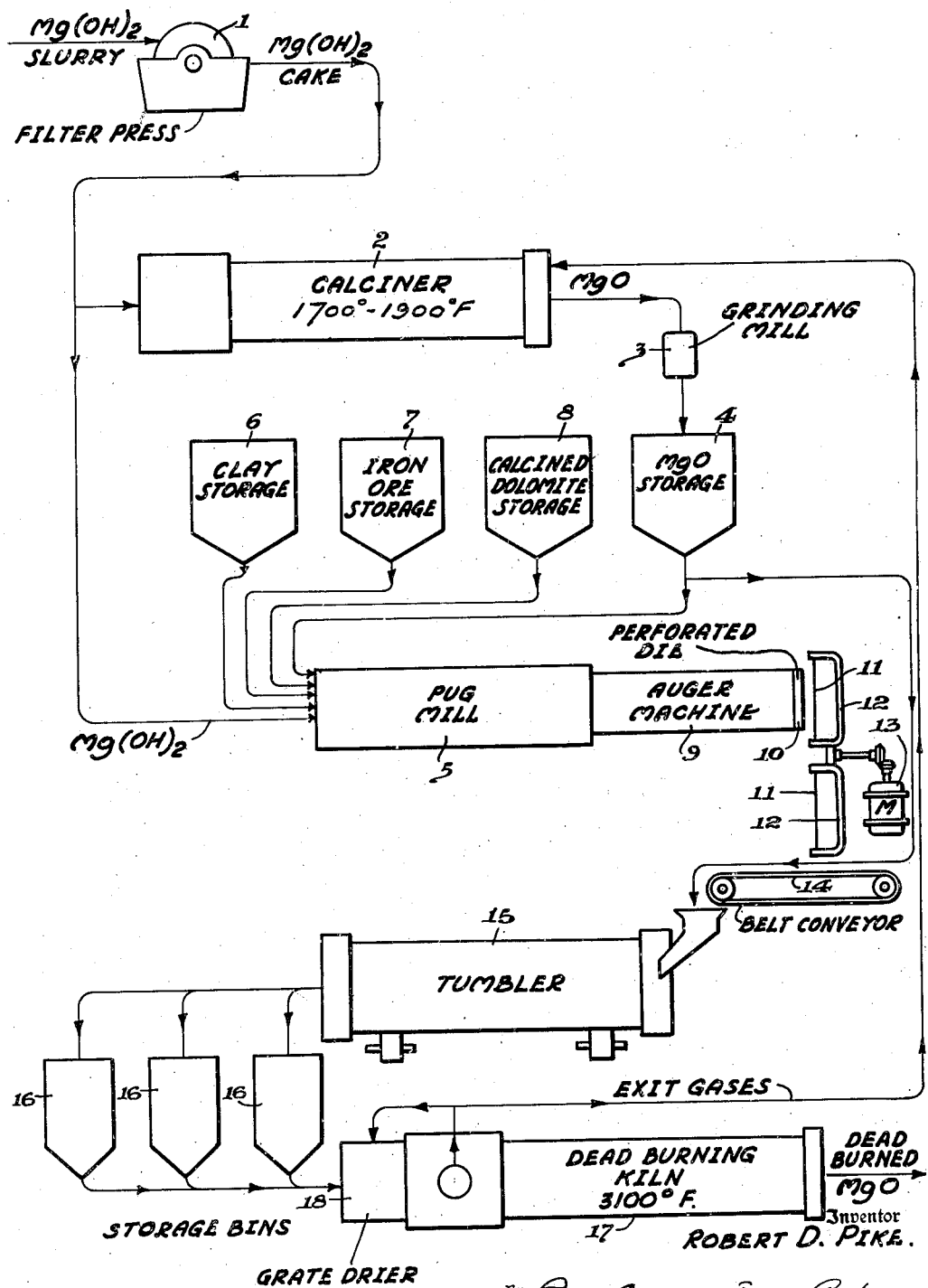

2,478,593

UNITED STATES PATENT OFFICE 2,478,593

PRODUCTION OF DEAD-BURNED MAGNESIA

Robert D. Pike, Pittsburgh, Pa., assignor to Harbison-Walker Refractories Company, Pittsburgh, Pa., a corporation of Pennsylvania Application December 5, 1946, Serial No. 714,223

1 Claim. (Cl. 23—201)

This invention relates to the production of dead burned magnesia from precipitated magnesium hydrate. The term "dead burned" as used herein has the same connotation as when it is used with reference to magnesite.

Dead burned magnesite grain used for the making of refractory bricks should have an apparent density, known as grain density, determined on particles between 3- and 4-mesh size, of about 3.10 to 3.20, and a magnesia (MgO) content preferably not less than about 92 per cent. It has been proposed to make dead burned magnesia from precipitated magnesium hydrate [$Mg(OH)_2$], but up to the present time it has not been possible to obtain such densities with such materials unless they are burned at excessively high temperatures, e. g., above about 3350° F., or in the electric furnace, and such procedures either are not practical or are not economical. Precipitated magnesium hydrate slurry when burned in a rotary kiln ordinarily has a grain density less than 3.0 so that it is unsatisfactory for brick making despite its favorable content of magnesia. Consequently all of the dead burned magnesia for brick making has preferably been derived from magnesite rock, except when burned in a rotary kiln at a very high temperature.

This invention is an improvement upon that described and claimed in Patent No. 2,348,847, granted May 16, 1944 upon an application filed by me. The invention of that patent was predicated upon my discovery that magnesium hydrate made by the process disclosed in Patent No. 2,373,911, granted April 17, 1945, on another application filed by me, and similar materials, when calcined lightly, say at not over about 1000° F., produce magnesia which is highly reactive chemically. The process of No. 2,348,847 is applicable likewise to magnesium hydrate made by the process of Patent No. 2,373,913, granted April 17, 1945 on still another application filed by me, which was an improvement upon the invention of No. 2,373,911.

The processes of my aforesaid Patents Nos. 2,373,911 and 2,373,913 involve the production of magnesium hydrate and calcium carbonate from dolomite, and basically it involves two steps. First, calcined and hydrated dolomite is treated with a magnesium chloride brine to precipitate magnesium hydrate and produce a brine containing calcium chloride. In the second stage a further amount of calcined and hydrated dolomite is treated with the calcium chloride brine from the first stage and with carbon dioxide to precipitate chalk and reform a magnesium chloride brine which is recycled for use in the first stage. Those reactions are broadly old but through my discovery of the importance of certain factors and correlation of factors, the said patented processes result in the production of a rapid settling and easily filterable magnesium hydrate of high MgO content.

As described in Nos. 2,373,911 and 2,373,913, the dolomite is calcined at a temperature such as to convert the calcium and magnesium carbonates to oxides but such that the lime is highly active, i. e., slakes rapidly and vigorously. The magnesia will also slake, but less so than the lime. The hydration step is critical in that process, it being important to produce a dry hydrated product of which at least about 50 to 60 per cent is granular, by which I refer to particles larger than 325-mesh, and most suitably larger than 200-mesh, but advantageously not appreciably larger than 65-mesh. The calcined dolomite is then dry hydrated with a calcium chloride brine which is free, or substantially free, from magnesium chloride. The concentration of this brine is important, and it should be from about 1.05 to 1.08 specific gravity at room temperature. The amount of brine used should somewhat exceed the amount necessary for hydration of the calcium oxide so that the product will be very granular. Using a brine of the concentration stated, it is preferred ordinarily to hydrate the dolomite with about 50 to 55 per cent by weight of that brine. The product will be dry and granular, the lime will be completely hydrated, and about 20 per cent of the magnesia will be hydrated.

The granular portion separated from the dry hydrated material is then preferably creamed with a further amount of the same calcium chloride brine to produce a lump-free slurry.

The cream thus produced is then ready for reaction in the first step with the magnesium chloride brine, preferably containing a small amount of sulfate ion as disclosed in No. 2,373,913, whereby magnesium hydrate is precipitated and a calcium chloride containing brine is formed. In this first step the amount of $MgCl_2$ in the brine used should be not less than about 105 per cent in excess of the amount theoretically necessary. This brine results from the second stage of the process, as noted, and as produced in the second stage it will contain ordinarily about 11 per cent of magnesium chloride and about 3 per cent of calcium chloride, and will have a specific gravity of about 1.10 to 1.14. The magnesium hydrate thus produced settles rapidly and filters easily and is high in content of MgO.

The invention of my earlier Patent No. 2,348,847 was predicated upon my discovery of the reactivity of MgO produced by light calcining of hydrate produced as just described, i. e., that when this reactive magnesia is mixed with the uncalcined magnesium hydrate a strong reaction sets in which liberates heat and converts the mixture to a hard mass of relatively dry hydrated magnesia. The mixture is formed into nodules, grains, pellets, or similar shapes prior to initiation of that reaction, and the heat evolved in the reaction so hardens the nodules, or granules, that thereafter they may be handled freely with substantially no proportion of dust being formed. After the nodules have become dried and hardened they are then burned to produce dead burned magnesia, suitably by passing them through a rotary kiln.

Continued experience with the process of the said Patent No. 2,348,847 has shown that while the reaction just alluded to suffices to harden the grains or pellets by autogenously generated heat, as described in the patent, it may at times actually occur so rapidly and proceed so vigorously that the mixture sets up to a hardened state while being formed, as in the extrusion step, and thus interfere with the operation of or actually stop the forming machine.

An object of this invention is to produce dead burned magnesia from precipitated magnesium hydrate by a process which is generally similar and embodies all of the advantages of that disclosed and claimed in my earlier Patent No. 2,348,847 but in which the autogenous hardening reaction is controlled simply and efficiently to prevent its premature occurrence.

Further objects will appear from the following specification.

After extended experience with the process of No. 2,348,847 in attempts to delay or slow down the autogenous hardening reaction, and after virtually reaching the conclusion that that could not be done satisfactorily, I have discovered that that object can be attained by calcining the wet magnesium hydrate at a temperature substantially higher than that disclosed in the patent but still productive of caustic magnesia, i. e., short of dead burning, and it is upon this that the present invention is predicated. As a result setting up in the extrusion mill or other forming machine is avoided and the product is of the same high quality described in the said patent.

In my earlier invention the reaction of autogenously liberated heat started very rapidly, usually in less than one hour after mixing. By reducing the reactivity of the caustic, in accordance with my present invention, as evidenced by an ignition loss of less than 1%, heating is scarcely discernible in two hours, but when the nodules have been stored in a bin overnight they become dried down to 7-8% free moisture, and are very hard and strong. Furthermore, they retain considerable heat as evidenced by their warmth.

The storage of the wet nodules in a bin as practiced by me in my present invention necessitates the use of some surface coating material to prevent or greatly reduce the tendency for the nodules to adhere to one another under the pressure exerted in the bin. I find that this can be done by introducing a relatively small amount of ground caustic into the tumblers, thus coating the nodules with dry caustic magnesia.

In the practice of the invention, therefore, precipitated magnesium hydrate, suitably in the form of a wet filter cake, is, as described in Patent No. 2,348,847, divided into two portions, and one portion is calcined. In contrast with the patent procedure, however, this portion is calcined at about 1700° to 1900° F. to an ignition loss of about 0.5 to 1 per cent to produce caustic magnesia. Thereafter the calcined material is treated in general accordance with the practice described in the said patent except that release of heat and hardening are delayed so as to occur in the storage bins. The caustic is ground, if need be, advantageously so that most of it will pass a 100-mesh screen, and it is then mixed with the other moist, or uncalcined, portion of magnesium hydrate. The proportions in which the two are mixed will vary in accordance with such factors as the particular burned density required and the character of the magnesium hydrate, but for the most part it will depend on the moisture content of the hydrate, the amounts of correcting materials added, the manner of mixing and the water content of the mixture needed for proper handling, or shaping, into nodules. It will be seen, therefore, that exact limits on the proportions of the two cannot be set. However, using the hydrate cake described in my aforesaid Patents Nos. 2,373,911 and 2,373,913 I now prefer to subject about fifty to sixty-five per cent of the filter cake to calcining to produce reactive magnesia. The critical factor here is that the mix shall be of a consistency suited to the production of dense nodules.

The calcined and uncalcined hydrates are then mixed and nodulized. It is of great advantage to have the nodules dense so that usually the mixture is made to the consistency of the "stiff mud" used in extruding ordinary clay brick with an auger machine, the latter preferably operating under vacuum in accordance with a practice well known in the clay working industries. The mix is then formed in any suitable manner into shapes of desired size, which for many purposes may be from ½ to ¾ inch in diameter, and in further accordance with the present invention these nodules are coated with some of the ground caustic magnesia dust and the nodules are then stored in bins wherein the reaction takes place, usually during the course of 6 to 24 hours, with concurrent drying and hardening of the nodules. After the reaction they are strong enough to permit removal from the bins and hard enough to permit rough handling and to form a suitable feed, virtually equivalent to rock magnesite, for calcining to the dead burned state, as in a rotary kiln. The nodules may lose some of their strength and hardness in the vicinity of 1400° to 1600° F. while passing through the dead burning kiln, but they do not break up to any great extent under the influence of the tumbling action in the kiln, and practically no dust is produced in the burning operation. The dead burning is effected at a maximum temperature of about 3000° to 3100° F. The nodules of dead burned magnesia delivered from the kiln have a grain density that is satisfactory for refractory purposes. This material may be crushed to yield hard, clean and granular grains practically free from dust.

Although it is not necessary, the hardened and dried nodules are preferably heated further before going to the dead burning kiln to further reduce their water content, which is about 6.5 to 8.0 per cent, wet basis.

Although it is not known with certainty why an exothermic reaction occurs between the caustic calcined magnesia and the magnesium hydrate, or why the product of that reaction produces the virtual equivalent of rock magnesite as a feed to the dead burning kiln, I now believe that the reasons are as follows: The hydrate produced by the process of my aforesaid Patents Nos. 2,373,911 and 2,373,913 usually contains a small amount of calcium and magnesium chlorides, and I believe that those chlorides react with the caustic calcined magnesia and thus to some extent act to harden the nodules. Most likely, however, the principal reaction involved is a re-conversion of the highly reactive magnesia with the water of the uncalcined hydrate to form a magnesium hydrate. This reaction releases much heat and thereby dries and hardens the nodules.

Based upon actual performance of the process and using as a reference datum 1 lb. caustic calcined MgO mixed with the wet cake, the heat supplied to account for the sensible heat and the evaporation of the water in the fresh pellets down to about 7.6 per cent on the dried and hardened pellets is about 704 B. t. u. per pound of the added caustic calcined MgO. But according to the data of International Critical Tables the heat of hydration by liquid water in the reaction $MgO + H_2O = Mg(OH)_2$ is about 202 B. t. u. per pound of MgO.

The heat effect is thus so much greater than would be expected as to be remarkable, but it indicates that the process involves factors not known prior to the invention of No. 2,348,847. One explanation of the release of several times the amount of heat theoretically available from the ordinary hydration of MgO that seems likely is that a stable form of a higher hydrate, $MgO.xH_2O$, has been formed. This reaction between reactive caustic calcined magnesia, water and precipitated magnesium hydrate, with or without the presence of magnesium chloride, to release heat and to cause a hard, rock-like nodule is, I believe, therefore new in the art.

There may be added to the mixture of caustic magnesia and uncalcined magnesium hydrate the correcting materials which are commonly combined with magnesites to confer special properties upon the dead burned grain. These materials and their functions in magnesia refractories are well understood in the art, but it may be said that generally clay and iron ore are added for this purpose, as well as calcined dolomite where it is desired to increase the lime content.

In the usual practice of making dead burned magnesia from precipitated magnesium hydrate, there is fed to the kiln a slurry of the hydrate. When burned at about 3100° F. to make grains the grain density is usually too low to be suitable for making brick. I believe that this is due to the fact that the slurry fed to the kiln contains about three to four pounds of water per pound of solids so that the evaporation of the water as the material passes through the kiln produces a hydrate which is quite finely divided and in loose, porous form. In the hot zone of the kiln the building up of grains from such material must be by accretion of myriads of fine particles which enter the hot zone from the drying and preheating zone. This building up of spheroids by accretion tends to form a porous grain of low density unless an excessively high temperature is used, say about 3350° F. Much, if not most, of the time spent in the hot zone is thus utilized in building the grains up by accretion so that there is little time for shrinking them to their minimum possible bulk, i. e., to maximum grain density. In contrast, the material fed to the dead burning kiln in my process is dense and of low water content, and the water is driven out quickly in the kiln without disrupting the nodules so that they pass through the kiln with little breaking up and the particles enter the hot zone in the form of spheroids of low porosity so that their entire time of residence in the hot zone is utilized in shrinking them and producing periclase whereby the grains are of minimum volume and maximum density.

The production of periclase, which is the most dense form of magnesia, in the dead burning operation is, I believe, favored by the presence of magnesium and calcium chlorides which are contained in small amounts in the magnesium hydrate produced by the processes of my aforesaid Patents Nos. 2,373,911 and 2,373,913. Ordinarily that material contains about 2 to 2.5 per cent of chlorine in the form of those chlorides, of which about 40 per cent is present as $MgCl_2$, and the balance as $CaCl_2$. Upon heating the former is rapidly decomposed into magnesia and hydrogen chloride, but the calcium chloride is more stable and is finally eliminated only in the hot zone of the kiln, possibly by decomposition to lime and hydrogen chloride, possibly by direct volatilization as such, and possibly by reaction with the alkali metal compounds, which may be present to a small extent, to produce volatile chlorides. The dense structure of the nodules may cause some residual hydrogen chloride resulting from decomposition of the magnesium chloride to be retained until they are in the hot zone of the kiln. I believe that the combination of these reactions results in catalyzing the transformation of magnesia into periclase, and as these grains are already interlocked in the dense structure, this helps to increase the density of the dead burned product. An advantage of the hydrate produced by my aforesaid processes is that it naturally contains these mineralizers although, as will be understood, mineralizers might be added for the same purpose to a hydrate not containing them, and it will be understood also that in addition to these alkaline earth chlorides other chlorides might be used for the same purpose.

The invention may be understood further with reference to the accompanying flow sheet. Precipitated magnesium hydrate made according to Patent No. 2,373,911, and preferably No. 2,373,913, or a similar material, is formed into a cake and washed on a rotary vacuum filter 1. The cake is removed and a portion, suitably 50 to 65 per cent, usually about 55 per cent, is passed to a dryer 2, such as a rotary kiln, where it is dried and calcined at a temperature of about 1700° to 1900° F., or to an ignition loss of about 0.5 to 1.0 per cent. The caustic calcined magnesia may then be ground in a mill 3, preferably so that at least 95 per cent will then pass a 100-mesh screen, after which it is passed to a storage bin 4 from when it may be withdrawn and passed to a suitable mixing device 5, such as a pug mill together with the remainder of the uncalcined hydrate.

There may be added to the material in mill 5 correcting agents, and for this purpose there are provided storage bins 6, 7 and 8, which contain respectively, ground clay, iron ore, and calcined dolomite. Other bins may be provided for other correcting materials necessary for bringing the final product to desired analysis. However, when the highest grade MgO is desired I prefer to add no outside material.

The relative amounts of filter cake and calcined magnesia from bin 4 may be proportioned so as to reduce the water content of the material in mixer 5 to give a nodular product as a result of the mixing operation. However, to produce a dead burned magnesia of the highest possible density and the cleanest grain structure, I prefer to regulate the proportions of uncalcined filter cake and calcined magnesia so that the mix leaving the mill will be similar to the "stiff mud" used in the making of bricks by extrusion from an auger machine; the amounts of the two will depend on the water content of the cake, but cakes made by the process of my aforesaid Patent No. 2,373,913 will usually contain from about 47 to 50 per cent of water. The mix is then passed from mill 5 to any suitable means for shaping it into appropriate sizes, for example, an auger machine 9 which forces it through a perforated die 10. The perforations in the die plate may suitably be ¾ inch in diameter, and the pugs are cut off in appropriate lengths, suitably ¾ inch, by wires 11 which are carried by frames 12 that are so mounted as to act as a rotating wheel which is driven through suitable gearing by a variable speed motor 13. I have also observed, as noted above, that the use of vacuum in the extrusion mill has a favorable effect upon the density of the pellets.

The pugs, which are dense in structure, next are passed, as by a belt conveyor 14, into a rotating tube 15 where they are tumbled to round off the edges while coating them with caustic burned magnesia dust which is fed into the tube for that purpose.

The nodules are then passed to one of a series of bins 16 from which they are withdrawn usually after 6 to 24 hours and after drying and hardening by autogenously released heat which is generated during storage in the bins. They are then passed to a dead burning kiln 17 in which they are converted at a miximum temperature not to exceed about 3100° F. into dead burned magnesia of high density. In passing the nodules into the rotary kiln it is preferred, for fuel economy in the kiln, to pass them as a bed over some form of perforated grate 18 through which the gases from the kiln are passed so as to substantially completely dry them, e. g., to a moisture content of about 1 per cent. Also this preheats them somewhat.

*Example*

The following example is illustrative of the practice of my invention. To make 100 tons of high grade dead burned magnesite containing 97.4 per cent of MgO, the charge to the pug mill is about as follows:

| | Tons |
|---|---|
| Caustic calcined MgO including coating dust | 56.5 |
| Uncalcined Mg(OH)$_2$, dry basis | 64.0 |
| H$_2$O in filter cake | 57.0 |
| Total | 177.5 |

There is some reaction almost immediately between the caustic calcined MgO and free water because although this formula shows about 32 per cent of free water an actual determination made on the particles leaving the tumbler shows about 25 per cent.

When processed as described above and burned at not to exceed 3100° F. this mix produces a dead burned magnesia having a grain density in excess of 3.15.

From what has been said it will be realized that the invention offers various and substantial advances in the art. Primarily, it provides dead burned magnesia having a grain density which suits it to the manufacture of magnesite bricks and for other refractory uses. Also, as compared with prior processes of making dead burned magnesia from precipitated hydrate, considerable economy results from the ability to burn at lower temperatures than have been indispensable heretofore. Economies result also from greater kiln output inasmuch as a kiln which will burn but about 50 tons of hydrate slurry per day is capable of burning about 150 tons per day of the autogenously hardened nodules described hereinabove.

According to the provisions of the patent statutes, I have explained the principle and mode of practicing my invention and have illustrated and described what I now consider to represent its best embodiment. However, I desire to have it understood that, within the scope of the appended claim, the invention may be practiced otherwise than as specifically illustrated and described.

I claim:

That method of making dense dead burned magnesia from moist precipitated magnesium hydrate, which comprises calcining a portion of said hydrate at a temperature between about 1700° to 1900° F. to produce chemically reactive magnesia, mixing the said magnesia with a portion of the uncalcined moist hydrate, forming the mixture into nodules, coating the nodules, storing the coated nodules in piled masses to promote the generation of heat and allowing them to harden and dry autogenously, and finally heating and calcining the hardened nodules to a temperature to produce dense dead burned magnesia.

ROBERT D. PIKE.

REFERENCES CITED

The following references are of record in the file of this patent:

UNITED STATES PATENTS

| Number | Name | Date |
|---|---|---|
| 2,348,847 | Pike | May 16, 1944 |

OTHER REFERENCES

Mellor, "Inorganic and Theoretical Chemistry," vol. 4, (1923) pp. 288-9.